United States Patent [19]
Carpenter et al.

[11] Patent Number: 5,527,614
[45] Date of Patent: Jun. 18, 1996

[54] PIGMENT DISPERSANTS WITH PRIMARY AMINE FUNCTIONALITY SUITABLE FOR USE IN CATHODIC ELECTROCOAT COMPOSITIONS

[75] Inventors: Clint W. Carpenter, Royal Oak; Timothy S. December, Rochester; William D. Hardigan, Highland, all of Mich.

[73] Assignee: BASF Corporation, Southfield, Mich.

[21] Appl. No.: 360,502

[22] Filed: Dec. 21, 1994

[51] Int. Cl.⁶ ..................................... B32B 15/08
[52] U.S. Cl. ..................... 428/418; 204/502; 204/503; 204/504; 523/404; 525/123
[58] Field of Search ............... 523/404; 525/123; 428/418; 204/502, 503, 504

[56] References Cited

U.S. PATENT DOCUMENTS

| | | | |
|---|---|---|---|
| 4,169,080 | 9/1979 | Spencer | 525/419 |
| 4,882,391 | 11/1989 | Brindopke et al. | 525/327 |
| 5,231,134 | 7/1993 | Carpenter et al. | 525/123 |
| 5,270,399 | 12/1993 | Czornij et al. | |
| 5,378,762 | 1/1995 | Czornij et al. | 525/187 |

*Primary Examiner*—Melvyn I. Marquis
*Assistant Examiner*—D. Aylward
*Attorney, Agent, or Firm*—Anne Gerry Sabourin

[57] ABSTRACT

A compound that is useful as a dispersant for pigments in waterborne coating compositions, particularly in cathodic electrocoat compositions, is described. The compound comprises an acrylic backbone having a pigment-interactive substituent and a stabilizing substituent. The pigment-interactive substituent has at least one primary amino group. The stabilizing substituent comprises an alkoxy-terminated polyalkylene oxide structure. The dispersant is useful in preparing electrocoat coating compositions.

22 Claims, No Drawings

PIGMENT DISPERSANTS WITH PRIMARY AMINE FUNCTIONALITY SUITABLE FOR USE IN CATHODIC ELECTROCOAT COMPOSITIONS

FIELD OF THE INVENTION

This invention relates to primary-amine functional pigment dispersants and particularly to the use of such dispersants in electrocoat coating compositions.

BACKGROUND OF THE INVENTION

The present invention concerns compounds that are useful for dispersing pigments in electrocoat coating compositions. In particular, the dispersant compounds of the invention may be used to disperse organic or inorganic pigments in the electrocoat compositions. The invention also provides a method for coating substrates using the inventive electrocoat compositions and the coated articles so formed.

Electrocoating, or electrodeposition coating, is widely used in the art for the application of polymeric coatings to electrically conductive substrates. In the electrocoat process, the substrate to be coated is used as one electrode in an electrical cell so that a current passed through the aqueous bath will deposit the coating onto the substrate. One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness.

Electrocoat baths usually comprise an aqueous dispersion of a principal film-forming resin, such as an acrylic or epoxy resin, having ionic stabilization. For automotive or industrial applications where hard electrocoat films are desired, the electrocoat coating compositions are formulated to be curable compositions. Usually, this is accomplished by including in the bath a crosslinking agent that can react with functional groups on the principal resin under appropriate conditions (e.g., with the application of heat) and thus cure the coating. Alternatively, the principal resin may be a self-crosslinking resin, having on the same resin one or more kinds of groups that are reactive toward each under the appropriate curing conditions.

Pigments are included in the composition for decorative effect and also, in the common situation where the electrocoat is used as a primer, to enhance the corrosion protection properties of the coating. In either case, it is essential that the pigment be well-dispersed in the electrocoat bath in order to promote bath stability, as well as adequate and uniform dispersion of the pigment in the deposited and subsequently cured coating. It is desirable to have the pigment dispersant molecules cure into the film to develop optimum properties in the cured coating. For this to happen, the dispersant molecule must carry one or more groups reactive toward either the principal resin or, if included, the, crosslinking agent. When the dispersant molecule is reacted into the cured film it is possible to thereby increase the integrity of the film, as well as to prevent the dispersant from acting as a water-sensitive plasticizer in the cured film.

The dispersant compound of the invention has a polymeric acrylic backbone on which are a pigment-interactive substituent and a stabilizing substituent. The stabilizing substituent provides nonionic stabilization in the electrocoat composition. Until now, dispersants have usually been only ionically stabilized. In addition, such dispersants usually have been either monomeric or epoxy-based compounds. Such dispersants are described, for example, in U.S. Pat. No. 3,947,339 (describing a cationic pigment dispersant that is the reaction product of stearyl glycidyl ether and N-methyl ethanolamine; a cationic resin for pigment dispersion that is the reaction product of a polyglycidyl ether of Bisphenol A with epoxy equivalent weight of 500 and diethylamine; and an alkyl imidazoline as a pigment dispersant); U.S. Pat. No. 5,281,316 (describing a pigment grinding vehicle prepared from a diglycidyl ether of Bisphenol A with epoxy equivalent weight of about 200, Bisphenol A, 2-ethylhexanol-half-capped toluene diisocyanate, and a quaternizing agent prepared by reacting dimethylethanolamine with 2-ethylhexanol-half-capped toluene diisocyanate); U.S. Pat. No. 4,443,569 (describing an epoxy-acrylic graft copolymer used to disperse pigments); and U.S. Pat. No. 4,769,400 (describing a grind resin prepared by reacting an epoxy resin based on bisphenol A, having an epoxy equivalent weight of 890, with diethanolamine).

Such methods often require lengthy processing times and are particularly ineffective for dispersing organic pigments in the electrocoat bath. Compared to the dispersions of the invention, the prior art dispersions have relatively poor color development and stability. Also, the ratio of pigment solids to resin solids by weight (often referred to as the pigment to binder ratio) is often relatively low for the prior art pigment paste dispersions. A higher pigment to binder ratio is desirable because it increases manufacturing efficiency. Furthermore, the compounds of this invention provide significant and unexpected advantages in reduced milling times and greater formulating latitude when the pigment paste dispersions are incorporated into paint compositions.

In U.S. Pat. No. 5,231,134, Carpenter et al. describe a pigment dispersant for cathodic electrocoating compositions that is prepared by polymerizing an ethylenically unsaturated monomer containing an isocyanate group with other ethylenically unsaturated monomers, and reacting the isocyanate group stepwise or simultaneously with a polyalkylene glycol monoalkyl ether and/or an amino-terminated polyalkylene glycol monoalkyl ether, and a compound containing at least a tertiary amine group and one functional group capable of reacting with the isocyanate group. The invention of the patent, like the present invention, provides good pigment pastes or pigment dispersions that, when used in an electrocoat bath, have less pigment settling and allow for use of a reduced amount of pigment and a reduced amount of volatile organics.

However, the present invention has an advantage over the prior dispersant of Carpenter et al. because the present invention can be reacted into the film when the coating is deposited on the substrate and cured. Reaction of the pigment dispersant into the film is desired in order to obtain optimum film integrity, physical properties, and durability. Moreover, organic pigments are often surface-treated to have anionic groups. The present invention has the capability of not only associating ionically with the pigment in the electrocoat bath, but also of binding the anionic treated pigment particles into the film during the curing process.

SUMMARY OF THE INVENTION

The present invention provides, in one aspect, a compound useful as a dispersant for pigments in electrocoat coating compositions. The dispersant compound has an acrylic backbone and on the acrylic backbone a pigment-interactive substituent and a stabilizing substituent. The pigment-interactive substituent has at least one primary amino group. The stabilizing substituent comprises an alkoxy-terminated polyalkylene oxide structure, —D(CHR$_1$CH$_2$O—)$_n$R$_2$. D is a divalent radical selected from —O— or —NR$_3$—, where R$_3$ is hydrogen or alkyl of one to twelve carbon atoms. R$_1$ is hydrogen or a mixture of hydrogen and alkyl of one to eight carbon atoms. Thus, the stabilizing substituent comprises either polyethylene oxide or a polyethylene oxide/polyalkylene oxide copolymer, having a degree of polymerization of n, n being an integer from one to one thousand. R$_2$ is alkyl of one to thirty carbon atoms.

The present invention further provides a method of dispersing a pigment with the dispersant compound.

The invention also provides an electrocoat coating composition comprising an aqueous dispersion of a water-dispersible, electrically-depositable, at least partially neutralized cationic resin, as well as the dispersant compound of the invention and at least one pigment that is dispersed with the dispersant compound.

Finally, the invention provides a method of coating a substrate with the electrocoat coating composition of the invention and of curing the deposited coating composition to produce a coated article.

The compounds of the invention provide an effective means of dispersing pigments. Exceptional stability is achieved. The ease of dispersion of these pigments using the compounds of the invention allows for reduced processing times and increased pigment concentrations in forming the pigment pastes. The pigment pastes formed according to the present invention also require a very low level of organic solvents or cosolvents in comparison to pigment pastes previously used. The combination of increased pigment concentration and reduced organic cosolvents in the pigment paste allow for greater latitude in formulating a coating composition, especially a coating composition having a lower content of volatile organic compounds. Additionally, an increased concentration of pigment in the pigment paste and reduced milling times improves manufacturing efficiency and reduces costs associated with the manufacture of the pigment paste dispersion.

The compounds of the present invention also offer an advantage for dispersing organic pigments. This advantage is particularly critical where the electrocoated article will not be overcoated with another coating. In this case, film integrity and durability, as well as color styling, are of great importance.

When used in an electrocoating process, the coating composition of the invention provides a smooth, contiguous coating over a variety of portions of the metal substrate, including recessed areas and edges. The dispersant can be reacted into the film to give optimum film integrity and physical properties. The coating composition is thus highly effective as an anticorrosive primer coating for metal substrates, particularly for motor vehicle bodies. The dispersant is also effective for dispersing many organic pigments that are otherwise difficult to disperse in electrocoat compositions. The coating composition of the invention is thus particularly suited to color coatings of high durability.

DETAILED DESCRIPTION OF THE INVENTION

The pigment dispersant compound useful for electrocoating compositions comprises an acrylic backbone having at least one pigment-interactive substituent with primary amino functionality and at least one polyalkylene oxide-based stabilizing substituent. The dispersant may be formed by different methods. According to a preferred method, the acrylic backbone is first formed by the reaction of ethylenically unsaturated monomers, including at least one monomer (i) with functionality that is used after the polymerization to adduct the pigment-interactive substituent and the stabilizing substituent onto the acrylic backbone. The invention contemplates a second method according to which the pigment-interactive substituent and/or the stabilizing substituent are prereacted with ethylenically unsaturated monomers (i) to form substituent-adducted ethylenically unsaturated monomers. The substituent-adducted monomers are then included in the acrylic polymerization reaction to form the dispersant molecule. In yet a different reaction scheme, the pigment-interactive substituent and/or the stabilizing substituent may be reacted onto the acrylic backbone during the polymerization reaction.

The order of incorporation of the substituents, or method of incorporating each substituent is not critical. The substituents need not bear the same functionality nor react with the same monomers (i).

The monomer (i) with functionality reactive toward the pigment-interactive substituent and the stabilizing substituent preferably has acid, anhydride, epoxy, or isocyanate functionality. More preferably, monomer (i) has anhydride, epoxy, or isocyanate functionality. In one particularly preferred embodiment, monomer (i) has isocyanate functionality.

If the monomer (i) has acid or anhydride functionality, the reaction (before, during, or after the polymerization reaction) with a hydroxyl on a substituent molecule will produce an ester linkage between acrylic backbone and substituent. Similarly, reaction with an amine on the substituent molecule will produce an amide linkage. Suitable acids and anhydrides are ethylenically unsaturated monocarboxylic acids containing 3 to 5 carbon atoms and ethylenically unsaturated dicarboxylic acids containing 4 to 6 carbon atoms and their anhydrides. Representative examples include acrylic, methacrylic, and crotonic acid; fumaric, maleic, succinic, tetrahydrophthalic, chlorendic, citratonic and itaconic acids and anhydrides.

If the monomer (i) has epoxy functionality, it will react with an acid on the substituent molecule to form a β-hydroxy ester linkage or with an amine on the substituent molecule to form a β-hydroxy amine linkage. If the substituent molecule has hydroxyl functionality, the hydroxyl group may be first reacted with an anhydride of a dicarboxylic acid to form an acid-functional substituent molecule and then reacted with the epoxy group on the acrylic backbone to form the β-hydroxy ester linkage. Representative monomers (i) with epoxy functionality are epoxy glycidyl esters of unsaturated acids such as glycidyl methacrylate, glycidyl acrylate, and allyl glycidyl ether.

If the monomer (i) has isocyanate functionality, it will react with a hydroxyl on the substituent molecule to form a urethane linkage or with an amine on the substituent molecule to form a urea linkage. Examples of suitable ethylenically unsaturated isocyanate compounds are isocyanatoethyl methacrylate, isocyanatoethyl acrylate, vinyl isocyanate, isopropenyl isocyanate, and meta-isopropenyl-α,α-dimethylbenzyl isocyanate. Meta-isopropenyl-α,α-dimethylbenzyl isocyanate is available from American Cyanamid Company, Wayne, New Jersey under the trade name "TMI(Meta) unsaturated aliphatic isocyanate," and is described in American Cyanamid Company's publication "TMI(Meta) unsaturated aliphatic isocyanate", publication number 2-849 1/88.

Any unreacted functionality from monomer (i) left on the acrylic polymer may be used during the crosslinking reaction or, optionally, reacted with a compound to consume the residual functionality. Such compounds are, for example, mono- or diamines or mono- or polyols. Representative examples of specific compounds are isopropyl amine, t-butyl amine, ethylene diamine, butanol, isopropanol, and 1,6-hexanediol.

The acrylic backbone is formed by reaction of the monomer (i) with other ethylenically unsaturated monomers. Suitable other ethylenically unsaturated monomers that may be used in forming a copolymer with the substituent monomer(s) include esters or nitriles or amides of $\alpha,\beta$-ethylenically unsaturated monocarboxylic acids containing 3 to 5 carbon atoms; esters of $\alpha,\beta$-ethylenically unsaturated dicarboxylic acids containing 4 to 6 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates, as well as hydroxy and amine hydroxyalkyl acrylates and methacrylates such as hydroxyethyl, hyroxypropyl, and hydroxybutyl acrylates and methacrylates, and aminoalkyl esters of methacrylic or acrylic acid like N,N-dimethylaminoethyl (meth)acrylate and t-butylamino ethyl (meth)acrylate; esters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, $\alpha$-methyl styrene, vinyl toluene, and 2-vinyl pyrolidone.

The copolymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

The polymerization reaction may be, for example, a free radical polymerization carried out in solution using solvents such as ketones, esters, glycol ethers, aromatic hydrocarbons, alkanes, cyclic alkanes, or mixtures of these solvents. Illustrative examples of ketones are acetone, methyl isobutyl ketone, methyl ethyl ketone, methyl propyl ketone, methyl amyl ketone; examples of esters are butyl acetate, ethyl acetate, and pentyl propionate; examples of glycol ethers are diethylene glycol dimethyl ether, ethylene glycol butyl ether, and propylene glycol methyl ether acetate; examples of aromatic hydrocarbons are toluene, xylene, naphthas, and mineral spirits; and examples of alkanes and cyclic alkanes are cyclohexane, hexane, and heptane. Preferred solvents are ketones.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization is usually carried out at temperatures from about 20° C. to about 200° C., preferably from 90° C. to 170° C. The reaction may conveniently be done at the temperature at which the solvent or solvent mixture refluxes, although reflux is not necessary to the reaction. The reaction temperature may be below reflux during the reaction; however, such temperature is then preferably held constant during the course of the reaction. The initiator should be chosen to match the temperature at which the reaction is carried out, so that the half-life of the initiator at the reaction temperature should preferably be no more than thirty minutes.

In a particularly preferred embodiment, the ethylenically unsaturated monomer (i) is meta-isopropenyl-$\alpha,\alpha$-dimethylbenzyl isocyanate. The free radical polymerization with meta-isopropenyl-$\alpha,\alpha$-dimethylbenzyl isocyanate is usually carried out at temperatures from about 20° C. to about 200° C., preferably from 90° C. to 170° C., more preferably from 120° C. to 160° C. Generally, the amount of meta-isopropenyl-$\alpha,\alpha$-dimethylbenzyl isocyanate that may be incorporated into the addition polymer by free radical polymerization increases with increasing reaction temperature.

The solvent or solvent mixture is generally heated to the reaction temperature and the monomers and initiator(s) are added at a controlled rate over a period of time, usually between one and eight hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed in order to ensure complete conversion. The acrylic copolymer preferably has a weight average molecular weight of at least 1000, preferably from 2000 to 50,000 and more preferably from 3000 to 20,000. The weight average molecular weight is determined by gel permeation chromatography using polystyrene standards.

The order in which the pigment-interactive and stabilizing substituents are reacted onto the acrylic backbone is not critical, and, in general, whether the two substituents are added simultaneously or sequentially will depend upon the particular functionalities chosen. The reactions between the pigment-interactive and stabilizing substituents and the polymeric backbone may be done neat or in solution. Addition of a solvent that is inert toward the reactants is preferred when the viscosity would otherwise be too high to achieve adequate mixing. Solvents containing hydroxyl groups and other active hydrogens are not preferred. Useful solvents include aromatic and aliphatic hydrocarbons, esters, ethers, and ketones. Such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents may be useful.

The pigment-interactive substituent compound has at least one primary amino group and at least one group capable of reacting with the functionality of monomer (i). Preferably, the functionality capable of reacting with monomer (i) is amino, hydroxyl, or acid functionality, and more preferably it is a secondary amine or a hydroxyl group.

Illustrative examples of such compounds with one primary amino group are 6-amino-1-hexanol, ethanolamine, 1-amino-2-propanol, 2-amino-1-propanol, N-methylethylenediamine, aminobutyric acid, 1-(2-aminoethyl)piperazine, and 2-amino-1butanol. Illustrative examples of such compounds with two primary amino groups are diethylene triamine, triethylene tetraamine, bishexamethylene triamine, diaminobenzoic acid, diaminobutyric acid, 1,3-diamino 2-propanol, 2,5-diamino pentanoic acid, 2,4 diaminobutyric acid, and dipropylene triamine. Compounds with more than two primary amino groups could also be used. Preferred compounds are ethanolamine, diethylene triamine, and aminobutyric acid. In a particularly preferred embodiment, the pigment-interactive substituent compound is diethylene triamine.

The primary amine or primary amines of the pigment-interactive substituent compound that will be used to associate with the pigment are preferably blocked before reaction of the substituent compound with the acrylic backbone. Preferably, the primary amines are blocked by reaction with a ketone to form a ketimine. The primary amines are regenerated from the ketimine upon addition of water. Ketimine formation is a well-known reaction. In general, the reaction may be carried out at the reflux temperature of the ketone used and is driven by the removal of the byproduct water. Ketimines are also commercially available, for example from Air Products and Chemicals, Inc. of Allentown, Pa.

The pigment-interactive substituent will have one, two, or more primary amine groups, depending on the compound chosen for reaction with the acrylic backbone. In a preferred embodiment, the pigment interactive substituent has one primary amine group. It is also preferred that the pigment interactive substituent comprises —$OCH_2CH_2NH_2$. In another preferred embodiment, the pigment interactive substituent has two primary amine groups. It is specifically preferred that the pigment interactive substituent comprises —$N(CH_2CH_2NH_2)_2$.

The pigment-interactive substituent is present in the dispersant compound in an amount of 0.1 to 20 percent by weight, and preferably in an amount of 1 to 10 percent by weight. A sufficient amount of the pigment-interactive substituent is included to firmly anchor the polymer to the surface of the pigment. This amount depends upon factors such as the size and nature of the pigment particle, and can readily be determined by one skilled in the art.

The stabilizing substituent has a terminal hydrophilic portion, represented by —$D(CH(R_1)CH_2O—)_nR_2$. D is a divalent radical selected from —O— or —$NR_3$—, where $R_3$ is hydrogen or alkyl of one to twelve carbon atoms. D is preferably —O— or —NH—. The stabilizing substituent may be formed by the reaction of an alkoxy poly(oxyalkylene) alcohol or with an alkoxy poly(oxyalkylene)amine either with a reactive group on the acrylic backbone or with a compound that in turn has functionality reactive with the acrylic backbone. The alkoxy poly(oxyalkylene) alcohol or alkoxy poly(oxyalkylene)amine employed can be formed by the alkoxylation of monohydric alcohols with ethylene oxide or mixtures of ethylene oxide with other alkylene oxides of up to ten carbon atoms, such as propylene oxide or butylene oxide. $R_1$ is thus either hydrogen or a mixture of hydrogen and alkyls of one to eight carbon atoms. It is particularly advantageous for $R_1$ to be either hydrogen or a mixture of hydrogen and alkyls of one to three carbon atoms.

The alkoxy poly(oxyalkylene) alcohol or alkoxy poly(oxyalkylene amine has a degree of polymerization of n, n being an integer from one to one thousand. Preferably, n is an integer from 20 to 200; more preferably, from 30 to 70. $R_2$ is an alkyl of one to thirty carbon atoms. In a particularly preferred embodiment $R_1$ is hydrogen and $R_2$ is methyl. The stabilizing substituent is present in the dispersant compound in an amount between 20% and 60% by weight, preferably between 25% and 45% by weight.

The pigments are preferably dispersed first in an aqueous concentrate containing the pigment(s) and compound(s) of the invention, said concentrate being commonly called a pigment grind or pigment paste. The pigment pastes are mixed with such ingredients as polymers, crosslinkers, and additional solvents (including additional water) to form an aqueous coating composition.

Pigments may be present in the composition in amounts between 0 and 35% by weight, based on total weight of solids in the coating composition. Preferably, between 15 and 25% pigment is used, based on total weight of solids in the coating composition. The pigments used may be inorganic pigments, including metal oxides, chromates, molybdates, phosphates, and silicates. Examples of inorganic pigments that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ferrocyanide (Prussian blue), ultramarine, lead chromate, lead molybdate, and lead silicate. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

The preferred pigments depend upon the desired color of the coating. When the coating applied is a primer, carbon black, titanium dioxide, extender pigments such as clay, and anti-corrosion pigments are commonly included.

It is normally necessary that the pigments be ground in the presence of the dispersant compound. The grinding may be done using methods and equipment known to the art. A basic discussion is provided in *Federation Series On Coatings Technology, Unit Sixteen: Dispersion and Grinding.* (Pub. by Federation of Societies for Paint Technology, Philadelphia, Pa, 1970), incorporated herein by reference.

Preferably, a premix is first prepared by stirring together the pigment to be ground, the dispersant compound and solvent. The pigment may be added to a mixture of the dispersant, water, and a cosolvent with mixing to form a premix. Preferably, the solvent is water or a water compatible solvent. The solvent may be, for example, a glycol ether, glycol ether acetate, ester, water, or combination of these. The solvent is preferably a mixture of water and a cosolvent, such as a glycol ether or a glycol ether acetate. A particularly preferred mixture is 50–98% water with the balance being a glycol ether. A sufficient amount of solvent is used to produce a final paste of workable viscosity. The appropriate amount depends upon the type of pigment to be ground, and can readily be determined by one skilled in the art. As a guideline, it is necessary to use more solvent for pigments having higher surface areas. A pigment paste of a high surface area pigment may have a 10–25% solids content, whereas a low surface area pigment may be made into a paste having 60% or more solids content.

The pigment to binder ratio used in preparing pigment pastes varies according to the pigment and is readily determined by one skilled in the art. For example, a formulation having too high of a pigment to binder ratio results in an unworkable viscosity during the grinding process. A pigment having a high surface area may require at least two parts by weight of the dispersant compound per one part by weight of the pigment (pigment to binder ratio=0.5). A pigment having low surface area may require only one part by weight of the dispersant compound per 50–100 parts by weight of the pigment (pigment to binder ratio=50–100). Usually, the pigment to binder ratio in practicing the invention is between two and 40.

After the premix is prepared, it is ground to reduce the pigment to the desired particle size. The grinding may be accomplished by introducing the pigment into a grinding mill, such as a horizontal mill, a roller mill, a ball or pebble mill, a sand mill, or an attritor. Horizontal mills, such as the kind manufactured by Eiger Machinery, Inc., Bensenville, Ill., are very efficient for producing pigment pastes of the instant invention. The grinding in the grinding mill is continued until the desired maximum particle size is obtained. The maximum particle size is preferably between 0.1 and 10 microns and more preferably less than six microns.

The pigment paste is added to an aqueous dispersion of at least the principal film-forming resin in making the electrocoat coating compositions of the invention. A variety of such resins are known including acrylic, polyester, epoxy, and polybutadiene. Preferably, the principal resin is cathodic, i.e., it has basic groups and is salted with an acid. In a cathodic electrocoating process, the article to be coated is the cathode. Water-dispersible resins used in the cathodic electrodeposition coating process have a cationic functional group such as primary, secondary and/or tertiary amine moiety as a positively chargeable hydrophilic group.

In a preferred embodiment, the resin is an epoxy resin functionalized with primary amines. Preferably, the epoxy resin is prepared from a polyglycidyl ether. Preferably, the polyglycidyl ether is the polyglycidyl ether of bisphenol A or similar polyphenols. It may also be advantageous to extend the epoxy resin by reacting an excess of epoxide group equivalents with a modifying material, such as a polyol or a polycarboxylic acid, in order to improve the film properties. Preferably, the polyglycidyl ether is extended with bisphenol A. Useful epoxy resins of this kind have a weight average molecular weight, which can be determined by GPC, of 3000 to 6000. Epoxy equivalent weights can range from 200 to 2500, and are preferably from 870 to 1900.

Amino groups can be incorporated by reacting the polyglycidyl ethers of the polyphenols with polyamines. In a preferred embodiment, the epoxide groups on the epoxy resin are reacted with a compound comprising a secondary amine group and at least one latent primary amine. The latent primary amine group is preferably a ketimine group. After reaction with the epoxy the primary amines are regenerated, resulting in an amine-capped epoxy resin. Resins used according to the invention preferably have a primary amine equivalent weight of 300 to 3000, and more preferably of 850 to 1300.

Epoxy-modified novolacs can be used as the resin in the present invention. The epoxy-novolac resin can be capped in the same way as previously described for the epoxy resin.

Acrylic polymers may be made cathodic by incorporation of amino-containing monomers, such as acrylamide, methacrylamide, dimethyl amino ethyl methacylate or t-butyl amino ethyl methacrylate. Alternatively, epoxy groups may be incorporated by including an epoxy-functional monomer in the polymerization reaction. Such epoxy-functional acrylic polymers may be made cathodic by reaction of the epoxy groups with polyamines according to the methods previously described for the epoxy resins. The molecular weight of a typical acrylic resin is usually in the range from 2000 to 50,000, and preferably 3000 to 15,000.

Cationic polyurethanes and polyesters may also be used. Such materials may be prepared by endcapping with, for example, an aminoalcohol or, in the case of the polyurethane, the same compound comprising a secondary amine group and at least one latent primary amine previously described may also be useful.

Polybutadiene, polyisoprene, or other epoxy-modified rubber-based polymers can be used as the resin in the present invention. The epoxy-rubber can be capped with a compound comprising a secondary amine group and at least one latent primary amine.

The amino equivalent weight of the cationic resin can range from 150 to 5000, and preferably 500 to 2000. The hydroxyl equivalent weight of the resins, if they have OH groups, is generally between 150 and 2000, and preferably 200 to 800. In a preferred embodiment, the primary amine groups are salted with an acid, such as phosphoric acid, propionic acid, acetic acid, lactic acid, or citric acid.

The resin is preferably able to be crosslinked with a crosslinking agent included in the coating composition. The crosslinker is a compound that can be reacted with the cationic resin after deposition of the coating on a substrate. The resin and the crosslinker react to form a crosslinker film on the substrate. A crosslinked film is particularly useful where an intractable, durable film is desired. Any of a number of crosslinking agents or curing agents may be used, depending upon the reactive functionality of the resin. Commonly-used crosslinking agents include blocked polyisocyanates, including isocyanurates of polyisocyanates (e.g., hexamethylene diisocyanate), and etherified melamine crosslinkers.

In a preferred embodiment of the invention, the crosslinking agent is a polyisocyanate. Useful polyisocyanates include toluene diisocyanate (TDI), methylene diphenyl diisocyanate (MDI), tetramethylxylene diisocyanate, hexamethylene diisocyanate, isophorone diisocyanate, and the biurets and isocyanurates of these isocyanates. In another preferred embodiment, the polyisocyanate is the reaction product of a diisocyanate and a polyol having less than twenty carbon atoms. The polyisocyanates are preferably pre-reacted with a blocking agent such an oxime, an alcohol, a lactam, or an amine, which blocks the isocyanate crosslinking functionality. Upon heating, the blocking agents separate and crosslinking occurs.

In yet another preferred embodiment of the invention, the crosslinking agent has a plurality of cyclic carbonate groups. The cyclic carbonate groups are five-member rings. The crosslinker agent preferably has from 2 to 8 cyclic carbonate rings, more preferably from 2 to 6 cyclic carbonate rings, and most preferably from 3 to 5 cyclic carbonate rings. Crosslinking agents with a plurality of cyclic carbonate groups can be readily prepared by reaction of a polycyclic ether such as a polyepoxide with carbon dioxide to convert the cyclic ether groups to cyclic carbonate groups. Polyepoxides are well-known in the art and readily available commercially. Alternatively, polyethers may be prepared by derivitization of polyols with an epihalohydrin. Polyepoxides useful for this purpose include the epoxy ethers of polyols and preferably triols, such as trimethylol propane epoxy ether, higher-functionality polyepoxides such as tetrakis(4-glycidyloxy-phenyl)ethane, and epoxy-novolacs. Other useful epoxy compounds include bisphenol A-based epoxy resins and copolymers of α,β-unsaturated glycidyl-functional monomers, such as glycidyl methacrylate. Cyclic carbonate groups are also formed by the reaction of diols with phosgene. For example, reaction of 1,2-diols with phosgene form five-member cyclic carbonate rings, while reaction of 1,3-diols form six-member cyclic carbonate rings. Polycyclic carbonates having five- or six-member rings are preferred. Five-member rings are particularly preferred.

The electrodepositable coating compositions of the present invention are aqueous. The resin dispersion is usually made at 15 to 45 percent nonvolatiles, preferably from 30 to 40 percent nonvolatiles. The resin dispersion and the pigment dispersion are mixed together, and often further diluted with deionized water, to form the electrocoat bath. The electrocoat bath is usually 15 to 40 percent nonvolatile, preferably from 15 to 25 percent nonvolatile. The average particle size diameter of the resinous phase is about 0.1 to 10 microns, preferably less than 5 microns.

The ratio of pigment to resin can vary widely, depending on the pigments used and the desired properties of the finished film. For example, a black film may be deposited using 0.5 parts of carbon black to 99.5 parts of resin, while a white film may be plated using 50 parts of titanium dioxide to 50 parts of resin. Usually, the pigment is 10 to 40 percent of the nonvolatile material in the bath. Preferably, the pigment is 15 to 30 percent of the nonvolatile material in the bath.

The above components are uniformly dispersed in an aqueous medium containing an acid in an amount sufficient to neutralize enough of the ionic groups to impart water-dispersibility to the resin. Examples of acids that may be used to neutralize the ionic groups include phosphoric acid, acetic acid, propionic acid and lactic acid. The cationic resin is at least partially neutralized. The cationic resin may be fully neutralized; however, partial neutralization is usually sufficient to impart the required water-dispersibility. By "partial neutralization" we mean that at least one, but less than all, of the basic groups on the resin are neutralized. By saying that the cationic resin is at least partially neutralized, we mean that at least one of the basic groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straightforward experimentation. Where the crosslinking agent used has a plurality of cyclic carbonate groups, the cathodic resin should be neutralized to a degree sufficient to prevent premature reaction of amino groups with the cyclic carbonate groups of the crosslinker. Typically, the amino groups are neutralized at least 80%, and more preferably 90–100%.

The electrocoat bath may also include water-miscible or water-soluble cosolvents. Cosolvents aid in dispersing the resins and also may help to coalesce the film and/or improve flow during cure to help form a smooth coating. Useful coalescing solvents include alcohols, esters, ethers and ketones. The preferred coalescing solvents include alcohols, ethers and ketones. Specific coalescing solvents include monopropyl, monobutyl and monohexyl ethers of ethylene or propylene glycol, dimethyl, diethyl, and dipropyl ethers of ethylene or propylene, glycol, or diacetone alcohol. A small amount of a water-immiscible organic solvent such as xylene, toluene, methyl isobutyl ketone or 2-ethylhexanol may be present, also. The amount of coalescing solvent is generally between about 0 to 15 percent by weight, preferably about 0.5 to 5 percent by weight based on total weight of the resin solids.

The electrodeposition coating compositions used in the invention can contain optional ingredients such as dyes, flow control agents, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as Amine C®, acetylenic alcohols such as those available from Air Products and Chemicals under the tradename Surfynol®. Surfactants and wetting agents, when present, typically amount to up to 2 percent by weight resin solids. Plasticizers are optionally included to promote flow. Examples are high boiling water immiscible materials such as ethylene or propylene oxide adducts of nonyl phenols or bisphenol A. Plasticizers can be used at levels of up to 15 percent by weight resin solids.

Curing catalysts such as tin catalysts can be used in the coating composition. Examples are dibutyltin dilaurate and dibutyltin oxide. When used, they are typically present in amounts of about 0.05 to 2 percent by weight tin based on weight of total resin solids.

The electrocoat bath should have an electroconductivity from 800 micromhos to 3000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of tee film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art. The electrodeposition coating composition may be applied on any conductive substrate, such as steel, copper, aluminum, or other metals or metal alloys, to a dry film thickness of 10 to 35 μm. The article coated with the composition of the invention may be a metallic automotive part or body. After application, the coated article is removed from the bath and rinsed with deionized water. The coating may be cured under conditions appropriate for the curing mechanism employed.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. However, in the automotive industry, the color coat is often a basecoat that is overcoated with a clearcoat layer. The primer-surfacer, topcoat enamel, basecoat or clearcoat may be either waterborne or solventborne. The coatings can be formulated and applied in a number of different ways known in the art. For example, the resin used can be an acrylic, a polyurethane, or a polyester. Typical topcoat formulations are described in U.S. Pat. Nos. 4,791,168, 4,414,357, and 4,546,046. The coatings can be cured by any of the known mechanisms and curing agents, such as a melamine or blocked isocyanate.

The invention is further described in the following examples. The examples are merely illustrative and do not in any way limit the scope of the invention as described and claimed.

EXAMPLES

Example 1

Preparation of a Dispersant Compound

Part A. Synthesis of Polymeric Backbone

A reactor fitted with a reflux condenser was charged with 180.5 grams of methyl amyl ketone and heated with stirring to reflux (150° C.). A mixture of 202.6 grams of TMI® (American Cyanamid Company, Wayne, N.J.), 364.6 grams styrene, 71.1 grams butyl methacrylate, and 64.0 grams of t-butyl peracetate solution (50% by weight solution in aromatic solvent) was added over a period of about 3 hours, all the while maintaining the reactor contents at reflux. The reflux was held for another 35 minutes. The reflux temperature at the end of the hold period was 153° C. A mixture of 47.5 grams of methyl amyl ketone and 31.9 grams of t-butyl peracetate solution (50% by weight solution in aromatic solvent) was added over a period of 30 minutes. The reaction was held at reflux for an hour and a half following the final addition. The product had a solids content of 85.1% and a measured isocyanate content of 0.705 milliequivalents per gram (meq/g).

Part B. Synthesis of Ketimine-functional Dispersant

A reactor fitted with a reflux condenser was charged with 190.5 grams of the polymeric backbone from Part A, 40.5 grams of methoxy polyethylene glycol ($M_n$ of 2000), and 0.05 grams of dibutyl tin dilaurate. The theoretical starting isocyanate content was 0.581 meq/g. The mixture was stirred and held at about 145° C. until the isocyanate content measured 0.441 meq/g. The reaction mixture was then cooled to 74° C., and 38.8 grams of the diketimine of diethylene triamine were added. An exotherm increased the temperature to 81° C. After twenty minutes, 131.5 grams of n-propoxypropanol and 131.5 grams of deionized water were added. The reaction mixture was cooled to 45° C. and then 21.3 grams of 86% lactic acid were added. The nonvolatiles were measured at 40.4%.

ExampleS 2-4

Preparation of Pigment Dispersions

Example 2

Black Pigment Dispersion

The following were weighed into a container and mixed well: 247.7 grams of deionized water, 27.5 grams of propylene glycol monopropyl ether, and 24.8 grams of the dispersant compound prepared in Example 1. 100 grams of carbon black (Raven 410, available from Columbian Chemicals) were stirred into the dispersant mixture to form a premix. The premix was mixed with a Cowles blade for fifteen minutes. The premix was charged to an attritor and ground for two hours to a fineness of less than four microns.

Example 3

Extender Pigment Dispersion

The following were weighed into a container and mixed well: 270.2 grams of deionized water, 30.0 grams of propylene glycol monopropyl ether, and 19.8 grams of the dispersant compound prepared in Example 1. 80.0 grams of an aluminum silicate clay pigment were stirred into the dispersant mixture to form a premix. The premix was mixed with a Cowles blade for fifteen minutes. The premix was charged to an attritor and ground for two hours to a fineness of less than six microns.

Example 4

White Pigment Dispersion

The following were weighed into a container and mixed well: 380.3 grams of deionized water, 42.2 grams of propylene glycol monopropyl ether, and 64.9 grams of the dispersant compound prepared in Example 1. 262.5 grams of titanium dioxide (R-900, available from DuPont) were starred into the dispersant mixture to form a premix. The premix was mixed with a Cowles blade for fifteen minutes. The premix was charged to an Eiger horizontal mill and ground for one hour to a fineness of less than six microns.

Example 5

Preparation of an Electrocoat Coating Composition

Part A. Preparation of a Primary Amine-Functional Resin (i). Base epoxy block

A reactor equipped with a reflux condenser was charged with 1312.4 grams of the diglycidyl ether of bisphenol A, 53.1 grams of xylene and 408.4 grams of bisphenol A. The contents of the reactor were heated to 125° C. At that temperature, 0.33 gram of triphenylphosphine was added. The reaction mixture exothermed to 163° C. The temperature was maintained for one hour. Following the hour hold, 474.1 grams of ethylene glycol monobutyl ether were added.

(ii). Preparation of the resin

A reactor with a reflux condenser was charged with 985.1 grams of the epoxy block of part A(i) and 114.5 grams of bisphenol A. The contents of the reactor were heated with stirring to 125° C. At that temperature, 1.2 grams of triphenylphosphine were added. The reaction exothermed to 140° C. The temperature was maintained at 145° C. for 2.5 hours, at which time 39.4 grams of ethylene glycol monobutyl ether and 100 grams of xylene were added to the reaction mixture. The reaction mixture was then cooled to 100° C. The epoxy equivalent weight was measured as 1795 g nonvolatile/eq epoxy. At 100° C., 187.5 grams of a 70% solution of the diketimine of diethylene triamine (Amicure KT-22 from Air Products, Allentown, Pa.) were added. The temperature was maintained at 95° C. for two hours. The resulting resin had a nonvolatile content of 71%, a final viscosity of 7200 centipoise at 50% in SE0313, a weight average molecular weight by GPC of 8792, and milliequivalents base (MeqB) per gram nonvolatile of 0.92.

Part B. Preparation of Cyclic Carbonate Crosslinker 1000 grams of epoxy novolac resin (GY1180 from Ciba-Geigy Corp., Ardsley, N.Y. epoxy equivalent weight of 176-181 grams/eq) and 1 gram of tetrabutyl ammonium bromide was charged to a stainless steel pressure reactor. The reactor was pressurized to 5 atm. with carbon dioxide. The pressure was maintained, by addition of more carbon dioxide when necessary, for 8 hours. At the end of that time, infrared analysis showed that the reaction was complete.

Part C. Preparation of Blocked Isocyanate Crosslinker

A reactor was charged with 483.7 grams of the isocyanurate of hexamethylene diisocyanate (Desmodur N3300 from Miles, Inc. Pittsburgh, Pa.) and 193.7 grams of methyl isobutyl ketone. The contents of the reactor were mixed and 288.6 grams of dibutylamine were added at a rate that allowed the temperature to remain below 80° C. When the isocyanate content (by titration) indicated that the reaction was >98% complete, then 14.3 grams n-butanol were added to quench the remaining isocyanate. The product was 80% nonvolatile.

Part D. Preparation of the Resin Emulsion

A reactor was charged with 525 grams of the primary amine-functional resin of Part A (heated to 60° C.), 140.6 grams of the cyclic carbonate crosslinker of Part B, 65.6 grams of the blocked isocyanate crosslinker of Part C, and 1 gram of an anticratering additive. The contents of the reactor were mixed until homogenous and then 33.1 grams of 86% lactic acid were added. Next, 241.2 grams of deionized water were added over 15 minutes and the contents were mixed until homogenous. Then 575.2 grams of deionized water were added to emulsify the resin. An additional 895.4 grams of deionized water were added to reduce the viscosity. The particle size was measured as 127 nm by light-scattering (using a Malvern Autosizer 2C from Malvern Instruments). The pH of the emulsion was 7.48, the nonvolatile content was 20.5%, the conductivity was 2200 micromhos, then milliequivalents acid (MeqA) was 0.86, and the MeqB was 0.66.

Part E. Preparation of Electrocoat Coating Composition

To a container were charged 318.9 grams of deionized water, 2214 grams of the resin emulsion prepared in Part D, 280.9 grams of the extender pigment dispersion of Example 3, 14.8 grams of the black pigment dispersion of Example 2, and 92.7 grams of the white pigment dispersion of Example 4. The ingredients were mixed to form the electrocoat coating composition.

Phosphated steel panels were plated from the electrocoat coating composition prepared in Example 5 at 50 volts and 1.0 amp for 2.2 minutes with a bath temperature of 90° F. The panels were baked for 30 minutes at 350° F. The film build was 12 microns.

The cured Coating layer was rubbed with a cloth saturated with methyl ethyl ketone. After one hundred rubs the coating had marring with slight scratching of the surface.

Two of the coated panels were topcoated using a commercial white high solids basecoat and high solids clearcoat (E174WE0018 and E126CD0014, available from BASF, Coatings and Colorants Division, Troy Mich. 48084).

One of the topcoated panels was tested loss of adhesion after a blast of 1200 ml of steel shot. The bottom half of the panel was subjected to a blast of 200 ml of steel shot (SAE standard cast shot size S780) at 0.2 MPa (30 psig). The loss of adhesion was tested by tape pull using Scotch brand 898 filament tape. 50% topcoat loss of adhesion was observed after the 1200 ml shot test.

The second of the topcoated panels was tested according to the Chrysler Motors Corporation Chipping Corrosion Test, Test No. 463PB52-01. The test consists of the following steps: The top half of the panel is scribed with a 15 cm "X" scribe. The bottom half of the panel is subjected to a blast of 200 ml of steel shot (SAE standard cast shot size S-780) at 0.2 MPa (30 psig). The panel is then subjected to 5 cycles of (a) immersing the panel in an aqueous solution of 5 weight percent sodium chloride, pH 6.5–7.1 for 15 minutes, (b) removing the panel and allowing it to dry for 75 minutes, and (c) placing the panel in a humidity cabinet at 60C and 85% relative humidity for 22.5 hours. (The panels are left in humidity over the weekend, so five cycles represents one week of testing.) Immediately after removal from humidity after the fifth cycle, the panel is once again blasted with 200 ml steel shot. The humidity cycles and shot blasts are repeated until the 6th repetition of the shot blast. The panels are then washed with water and allowed to dry for at least 30 minutes. After drying the coating adhesion is tested by tape pull using Scotch brand 898 filament tape. The panel plated from the electrocoat composition of Example 5 and then topcoated was tested according to this method. The results were scribe creep of 4 mm and 64% topcoat loss in chip corrosion test after the 25 cycles.

The invention has been described in detail with reference to preferred embodiments thereof. It should be understood, however, that variations and modifications can be made within the spirit and scope of the invention.

We claim:

1. An electrocoat coating composition comprising:
   (a) an aqueous dispersion of a water-dispersible, electrically-depositable, at least partially neutralized cationic resin;
   (b) a dispersant compound comprising an acrylic backbone having a pigment-interactive substituent and a stabilizing substituent, wherein the pigment-interactive substituent has at least one primary amino group, and the stabilizing substituent comprises an alkoxy-terminated polyalkylene oxide structure $D(CHR_1CH_2O—)_nR_2$,
   wherein
   D is a divalent radical that is —O— or —NR$_3$—, wherein R$_3$ is hydrogen or alkyl of one to twelve carbon atoms;
   R$_1$ is hydrogen or a mixture of hydrogen and alkyl of one to eight carbon atoms;
   R$_2$ is an alkyl of one to thirty carbon atoms; and
   n is an integer from one to one thousand; and
   (c) at least one pigment that is dispersed with the dispersant compound.

2. A coating composition according to claim 1 wherein the cationic resin is an epoxy resin functionalized with primary amines.

3. A coating composition according to claim 2 wherein the composition further comprises a crosslinker that can be reacted with the cationic resin after deposition of the coating on a substrate to form a crosslinked film on the substrate.

4. A coating composition according to claim 3 wherein the crosslinker has cyclic carbonate functionality.

5. The coating composition according to claim 4 wherein the crosslinker is a blocked polyisocyanate compound.

6. A coating composition according to claim 1, wherein the molecular weight of the acrylic backbone is from 2000 to 50,000.

7. A coating composition according to claim 1 wherein the pigment interactive substituent and the stabilizing substituent are linked to the acrylic backbone through urethane or urea linkages.

8. A coating composition according to claim 1 wherein the pigment interactive substituent and the stabilizing substituent are linked to the acrylic backbone through β-hydroxy ester linkages or β-hydroxy amine linkages.

9. A coating composition according to claim 1, wherein the pigment interactive substituent has one primary amine group.

10. A coating composition according to claim 1, wherein the pigment interactive substituent comprises —OCH$_2$CH$_2$NH$_2$.

11. A coating composition according to claim 1, wherein the pigment interactive substituent has two primary amine groups.

12. A coating composition according to claim 1, wherein the pigment interactive substituent comprises —N(CH$_2$CH$_2$NH$_2$)$_2$.

13. A coating composition as described in claim 1, wherein the D is either —O— or —NH—.

14. A coating composition as described in claim 1, wherein the R$_1$ is hydrogen and the R$_2$ is methyl.

15. A coating composition as described in claim 1, wherein the n is from 20 to 200.

16. A coating composition as described in claim 1, wherein the n is from 30 to 70.

17. A coating composition according to claim 1 comprising at least an inorganic pigment.

18. A coating composition according to claim 1 comprising at least an organic pigment.

19. A coating composition according to claim 1 wherein the method of dispersing the pigment with the dispersant compound is by (a) adding the pigment to a mixture of the dispersant, water, and a cosolvent, and mixing to form a premix, and (b) grinding the premix to produce a dispersion in which the maximum particle size is less than six microns.

20. A method of coating a substrate comprising the steps of (a) electrodepositing the coating composition of claim 1 onto the substrate; and (b) curing the coating composition deposited on the substrate.

21. A coated article that has been coated according to the method of claim 20.

22. A coated article according to claim 21 wherein the coated article is an automotive part or body.

* * * * *